United States Patent [19]
Lucius

[11] Patent Number: 6,089,008
[45] Date of Patent: Jul. 18, 2000

[54] LINE SPLICE AND METHOD OF FORMING SAME

[75] Inventor: John H. Lucius, Athens, Ga.

[73] Assignee: Wellington Leisure Products, Inc., Madison, Ga.

[21] Appl. No.: 09/067,045

[22] Filed: Apr. 27, 1998

[51] Int. Cl.[7] .................................................. D01N 17/00
[52] U.S. Cl. ......................................... 57/25; 57/22
[58] Field of Search .................... 57/22, 25, 26; 24/115 K; 264/240, 263, 273, 328.6

[56] References Cited

U.S. PATENT DOCUMENTS

| | | | |
|---|---|---|---|
| 345,219 | 7/1886 | Dodge | 57/22 |
| 1,986,974 | 1/1935 | Kellogg | 57/22 X |
| 2,703,300 | 3/1955 | Koon | 154/116 |
| 2,835,012 | 5/1958 | Reiter | 24/129 |
| 2,983,976 | 5/1961 | Ehmann | 24/123 |
| 4,191,009 | 3/1980 | Thomson | 57/22 X |
| 4,236,281 | 12/1980 | Bottum | 24/115 R |
| 4,392,014 | 7/1983 | Trumble et al. | 174/92 |
| 4,573,204 | 2/1986 | Polett | 383/41 |
| 4,810,444 | 3/1989 | Alberino et al. | 264/102 |
| 4,912,816 | 4/1990 | Brandt | 24/129 R |
| 5,022,735 | 6/1991 | Dahlgren | 350/96.21 |
| 5,339,498 | 8/1994 | Parsons | 24/129 R |
| 5,655,269 | 8/1997 | Sagalovich | 24/115 R |

FOREIGN PATENT DOCUMENTS

| | | | |
|---|---|---|---|
| 6-136676 | 5/1994 | Japan | 57/202 |

*Primary Examiner*—William Stryjewski
*Attorney, Agent, or Firm*—Kennedy, Davis & Hodge LLP

[57] ABSTRACT

A line splice has two lengths of fibrous rope that have multiple strands and interstices. The two lengths are held adjacent to each other by a plastic encapsulate that both surrounds the two rope lengths and fills the interstices. In forming the splice a two part polyurethane complex plastic is injected into the mold to create an exothermic reaction and heat sufficient to cause the plastic to flow both inside and outside the two lengths of fibrous rope.

17 Claims, 2 Drawing Sheets

LINE SPLICE AND METHOD OF FORMING SAME

TECHNICAL FIELD

This invention relates generally to devices and methods of splicing rope and particularly to rope splices that form an eye or bight for mooring a boat to a dock cleat, post or the like.

BACKGROUND OF THE INVENTION

Watercraft are typically secured to a dock by the use of ropes or lines which are tied or looped over cleats on the watercraft and docks. A common method of fastening these ropes to a cleat or mooring post is by looping the rope around the cleat or post and tying it off with one or more knots. The tying and untying of a good knot, however, requires skill not typically possessed by the recreational boater.

To eliminate the need for tying knots, boat tie lines have been made with an eye, or bight at one end which can be looped quickly and easily over a cleat or post. Typically the eye is formed by bending an end of the rope back upon itself and splicing it to form a closed loop. In the past, these tie lines have been hand spliced by weaving at the end of the rope into the woven body of the inward portion of the rope. While this type of splice provides good strength, the formation of the splice is time consuming and requires substantial skill. As such, in these hand spliced tie lines tend to be very expensive. Also, as they rub against the edge of the boat or dock, as the moored boat moves with the motion of waves, the splice becomes chafed requiring either replacement of the tie line or cutting and re-splicing the line.

To reduce this production time and expense, tie lines have been manufactured with mechanical splices which hold the rope in a permanent loop. For example, U.S. Pat. No. 4,236,281 shows a mechanical clamp with two sections which sandwich the inward and end portion of a rope looped positioned therebetween. Each section has two concave channels with a series of teeth which grip the rope to reduce the possibility of slippage. Similarly, U.S. Pat. No. 2,835,012 shows a mechanical clamp made of sheet metal with a middle portion defined by an upstruck ridge and two outer shoulders that are bendable over the middle portion to form a splice. A rope or line is spliced by laying it atop the sheet metal in a position crossing the upstruck ridge so that the outer shoulders of the metal sheet are bent over the rope segments compressing the rope against the ridge.

While these mechanical clamps are easy and inexpensive to produce, they nevertheless tend to slip when loaded and stressed. This occurs because a twisted or braided multifibrous rope becomes slimmer when stretched. Once thinned in this manner the rope no longer is pressed firmly against the outer mechanical clamp and thus can slide therein under the same load that has caused it to slim down.

Other examples of mechanical splices are seen in U.S. Pat. Nos. 4,912,816 and 5,339,498 which provide devices that allow an adjustable eye to be formed in the end of the tie line with minimal use of knots. These devices comprise a unitary body having channels through which the rope is threaded in opposite directions. The rope is prevented from passing back through the channel by tying a knot in the rope end as shown in the U.S. Pat. No. 4,912,816, or wedging the rope end within a V shaped notch as shown in the U.S. Pat. No. 5,339,498. While these slip knot type clamps eliminate the problem of slippage encountered with the previously described permanent eye clamps they are cumbersome and often require re-threading.

Accordingly, it is seen that there remains a need for a line splice that is simple and inexpensive to produce, but yet has the strength of a hand interwoven splice. It is to the provision of such a splice and a method of forming such that the current invention is primarily directed.

SUMMARY OF THE INVENTION

In a preferred form of the invention a line splice has two lengths of rope having multiple strands and interstices between the strands. The two lengths of rope are held adjacent to each other by a plastic encapsulant that both surrounds the two rope lengths and substantially occupies the interstices.

In another preferred form of the invention two lengths of fibrous rope are spliced together by placing the two lengths of rope adjacent one another in a mold and injecting a two part polyurethane complex plastic into the mold creating an exothermic reaction and heat sufficient to cause the plastic to flow both inside and about the two lengths of fibrous rope without melting their fibers. The plastic is then cooled and hardened.

BRIEF DESCRIPTION OF THE DRAWINGS

FIG. 1 illustrates a tie line splice and eye that embodies principles of the invention in a preferred form while FIG. 1A is a cross sectional view of the splice taken along plane 1A—1A together with an enlarged breakout portion thereof.

DETAILED DESCRIPTION

Figures 1, 1A:
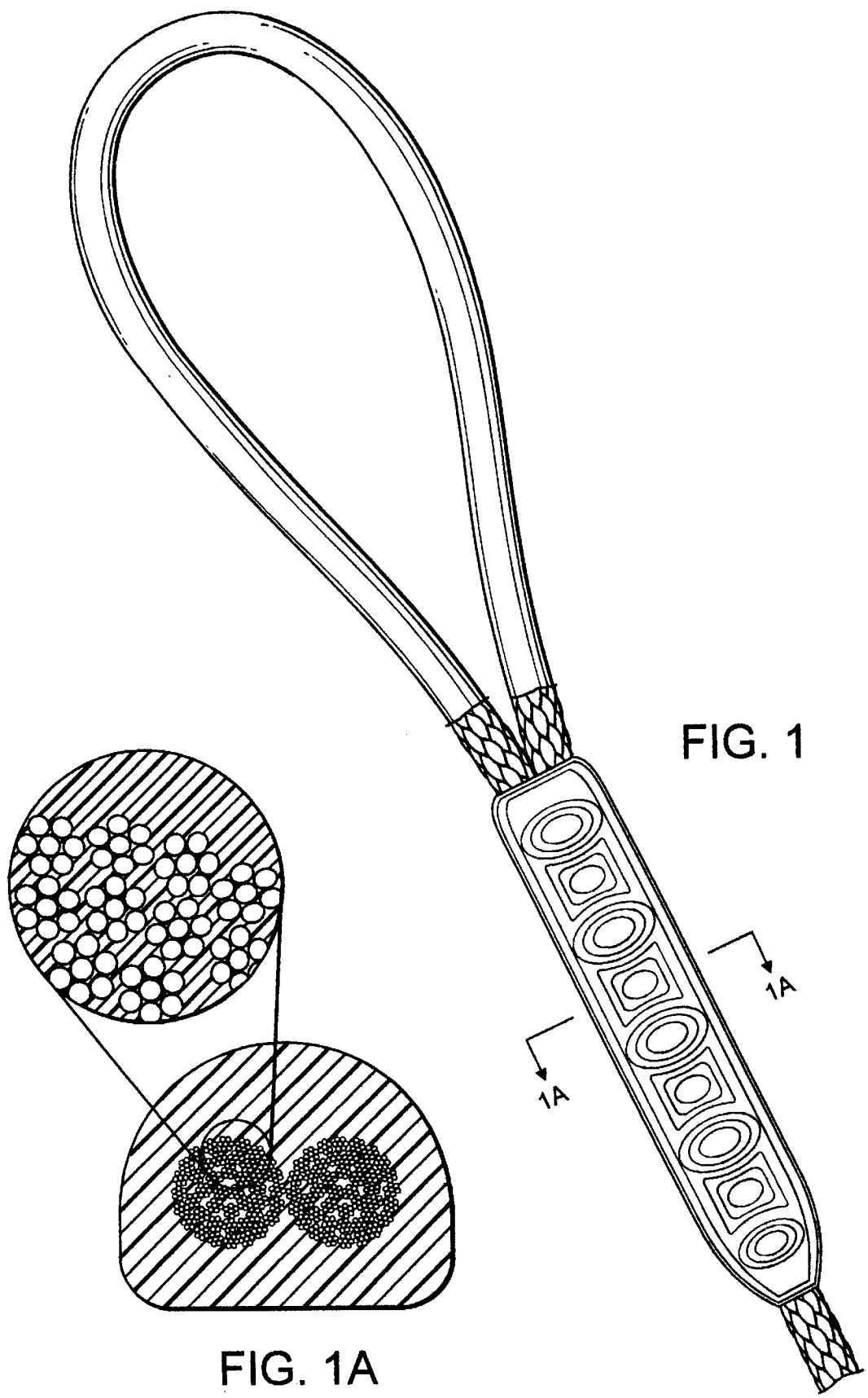
Figure 2:
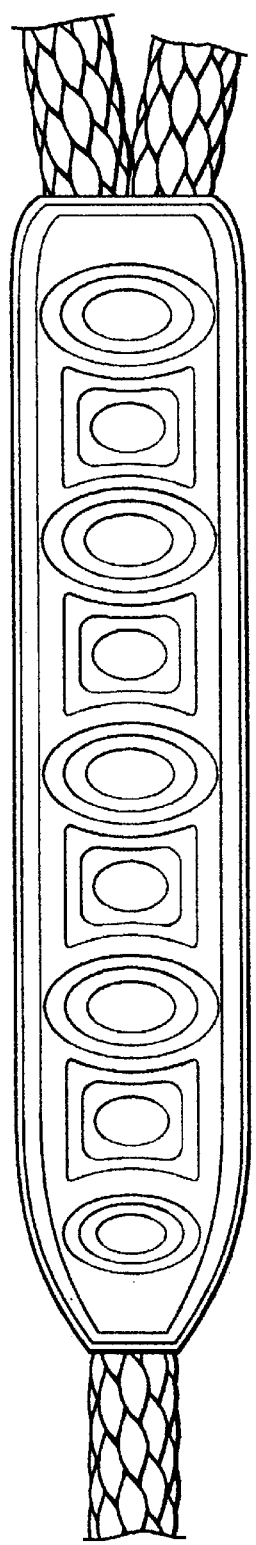
FIG. 2 is a side view of the splice shown in FIG. 1.
Figure 3:
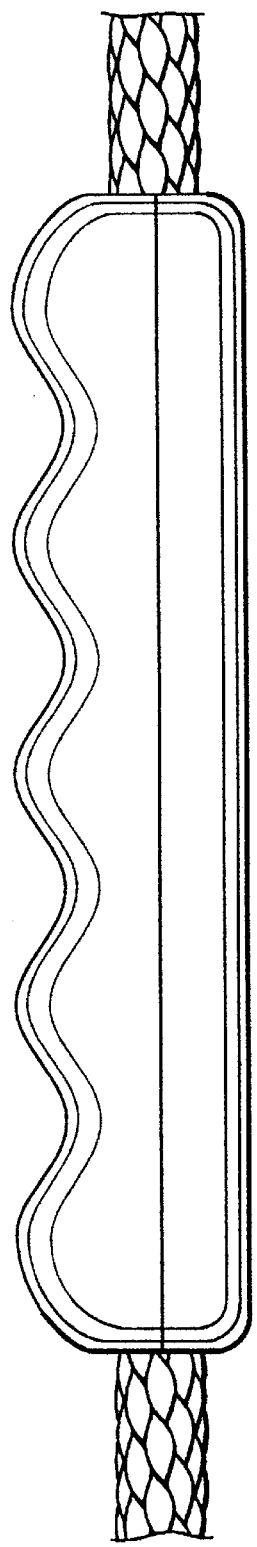
FIG. 3 is side view of FIG. 2.

Referring next to the drawing, there is shown a spliced tie line or rope 10 having a looped bight or eye 12 and a splice 15. The tie line 10 is comprised of several interwoven stands 17. Each strand 17 here is comprised of five twisted polypropylene or nylon fibers 18, as best shown in FIG. 1A. The rope 16 has spaces or interstices 19 between adjacent woven strands 17. A protective, plastic sheath 20 is positioned over the eye 12.

The splice 15 is comprised of two lengths of rope 16 that extend side by side as best shown in FIG. 1A. These two lengths of rope are surrounded by a length of polyurethane or encapsulate 14. The polyurethane encapsulate 14 not only surrounds the two lengths of rope but actually penetrates and occupies the interstices between their fibers, as best shown in the break out portion of FIG. 1A. This serves to have the polyurethane firmly interlocked with the rope both internally and externally.

In FIG. 1 it is seen that two lengths of rope emerge from one end of the splice while only one emerges from the opposite end. Thus the splice provides for an eye 12 on an end portion of the rope 16. The actual end of the rope here is within the splice and, though not shown, is near to but spaced from the end of the splice from which the single length emerges.

The just described tie line 10 is formed by looping the end of the rope 16 upon itself so that two lengths of the rope are positioned side by side. The two lengths are positioned within an open two piece mold having an interior surface shaped to form the desired shape of the splice. The two piece mold is then closed about the rope lengths while a load of approximately 20 lbs is place on them to maintain them taunt. The ends of the mold contacts and compresses the two lengths at one end and a single length at the opposite end thereby eliminating the interstices in these locations and holding the two lengths of rope in a fixed position.

The mold has two separate feed channels which converge into a large diameter single supply channel that extends to the interior of the mold. Each feed channel has an injection nozzle therein adapted to create a liquid spray. The nozzle of one feed channel is coupled to a pressurized supply of liquid isocyanate while the nozzle of the other feed channel is coupled to a pressurized supply of liquid polyol. The combination of isocyanate and polyol form a two part polyurethane commonly referred to as a RIM (reaction injection molding) resin. The mold also has thermal control passages therethrough coupled to a supply of cooled water and a supply of heated water the flow of which is thermostatically controlled.

With the mold maintained at a constant temperature of approximately 160° F. by the introduction of heated or cooled water through the thermal control passages, the plastic encapsulant is formed by spraying each part of a two part polyurethane through the nozzles of the two feed channels. Each of the two parts is injected at approximately 2,500 p.s.i and 80° F. so that the two sprays immediately combine with each other. The combination immediately passes into the supply channel and immediately therefrom into the mold. The reduced size of the supply channel, as compared with the feed channels, reduces the pressure of the polyurethane complex entering the mold to approximately 80 p.s.i.

The combining of the two polyurethane parts causes an exothermic reaction in the mold which heats the polyurethane complex to a temperature range of 200–225° F. The heated polyurethane complex has a viscosity at this temperature which allows it to flow both over the ropes and into the ropes between their strands 17 so as to occupy their voids or interstices 19. The polyurethane complex is prevented from flowing out of the mold through the interstices of the rope by the compression of the rope by the ends of the mold. After approximately 20 seconds the exothermic reaction is complete and the polyurethane complex has cooled to a temperature which solidifies the polyurethane complex. The mold is then opened and the splice removed.

The resultant splice is exceptionally strong. A pulling force or load is placed upon the rope the strands of the weave are naturally forced towards each other thereby forming a tighter grip upon the portion of the encapsulant which occupy the interstices 19 between the strands. In other words, the attempted compression force of the rope squeezes the portion of the encapsulant between adjacent strands. This tightening of the fibers against the encapsulant increases the holding strength of the encapsulant. Furthermore, as the interstices are now occupied, the rope cannot actually slim down significantly and thus loosen itself from the surrounding encapsulant, as with those splicing devices of the prior art having external clamping devices.

The eye 10 and splice 15 are located such that the splice extends from approximately 12 inches from the rounded end of the eye to approximately 18 inches from the end of the eye. This distance matches the typical distance from a deck cleat to the edge of a small boat deck. As such, this positioning of the splice places it on the boat edge rather than the exposed rope to inhibit chaffing and fraying.

The exterior of the splice is molded in the shape of a handle having a series of gripping ridges 22 suitable for obtaining a firm grip for pulling the rope under load, especially in wet conditions. This is particularly useful as in pulling the tie line to draw a boat closer to the dock in order to slacken the tie line and unhook the eye from the mooring post or boat cleat. Although the splice shown in the drawing is used in connection with an eye of a tie line formed from two lengths of the same rope, it may of course also join two or more separate ropes. In that case, the ends of the separate ropes to be joined are placed adjacent to one another within the mold rather than one length of rope being double backed upon itself to form two lengths. The molding process is then carried out upon these portions as previously described.

While different rope fiber materials can be used utilizing principles of the present invention, the rope material should be selected such that the exothermic reaction of the polyurethane does not produce heat sufficient to melt or burn the rope fibers. Similarly, other types of plastics may be used so long as they are not heated to a temperature substantially equal to or greater than the melting point of the rope fibers. These other plastics would also have to have a viscosity that allows them to flow between the fibers of the rope. It has been found, for example, that molten polyethylene does not have a viscosity which allows it to penetrate the fibers of most conventional rope.

It thus is seen that an improved line splice and method of producing such is now provided which provides an extremely strong joinder of two rope lengths which is resistant to slippage when stressed under load conditions. While the preferred form of the splice has been described in detail it should be understood that many modifications, additions and deletions may be made thereto without departure from the spirit and scope of the invention as set forth in the following claims.

What is claimed is:

1. A line splice comprising two lengths of rope that have a selected melting point and multiple strands and interstices between said strands, said two lengths of rope held adjacent to each other by a polyurethane complex plastic encapsulant comprised of isocyanate and polyol that has a melting point below said selected melting point of said two lengths of rope and that both surrounds said two rope lengths and substantially occupies said interstices.

2. A line splice comprising two lengths of rope unitarily connected by a third length of rope that provides an eye, said two lengths of rope having multiple strands and interstices between said strands, said two lengths of rope held adjacent to each other by a plastic encapsulant that both surrounds said two rope lengths and substantially occupies said interstices.

3. A line splice comprising two lengths of rope having multiple strands and interstices between said strands, said two lengths of rope held adjacent to each other by a plastic encapsulant that both surrounds said two rope lengths and substantially occupies said interstices, and wherein said plastic encapsulant has an external surface formed with a series of ridges that provide a hand grip.

4. A unitized line splice comprising two lengths of fibrous rope having interstices between adjacent fibers, said two length of fibrous rope being positioned side by side; and a plastic encapsulant surrounding said two lengths of fibrous rope and substantially filling said interstices to form a unitized splice with the encapsulant interlocked with said fibers.

5. The line splice of claim 4 wherein said two lengths of fibrous rope have a selected melting point and said plastic encapsulant has a melting point below said selected melting point.

6. The line splice of claim 5 wherein said plastic encapsulant is a polyurethane complex comprised of isocyanate and polyol.

7. The line splice of claim 4 wherein said two lengths of fibrous rope unitarily extend from a third length of fibrous rope in the shape of a loop that forms an eye.

8. The line splice of claim 4 wherein said encapsulant has an external surface formed with a series of ridges that provide a hand grip.

9. A method of splicing together two sections of fibrous rope having interstices between their fibers comprises the steps of:
   (a) positioning the two sections side by side within an injection mold;
   (b) injecting a fluid plastic into the mold under temperature and pressure conditions sufficient to cause the plastic to flow into the rope interstices of the two rope sections and about the two rope sections without melting the rope fibers;
   (c) solidifying the plastic within the mold about the two rope sections and within the interstices to form a unitized splice; and
   (d) removing the unitized splice from the mold.

10. The method of claim 9 wherein step (b) a plastic having a melting point below that of the fibers of the two sections of is injected into the mold.

11. The method of claim 10 wherein step (b) a RIM resinous plastic is injected into the mold.

12. The method of claim 11 wherein step (b) a two part polyurethane complex consisting essentially of isocyanate and polyol is injected into the mold.

13. The method of claim 12 wherein step (b) the isocyanate and polyol are mixed together prior to being injected into the mold.

14. The method of claim 12 wherein step (b) the isocyanate and polyol are injected into the mold at approximately 80 p.s.i.

15. The method of claim 9 wherein prior to step (a) a bight is formed in a fibrous rope from which the two sections unitarily extend.

16. A method of splicing together two lengths of fibrous rope wherein the two lengths are placed adjacent one another in a mold and a two part polyurethane complex plastic is injected into the mold creating an exothermic reaction and heat sufficient to cause the plastic to flow both inside and about the two lengths of fibrous rope without melting their fibers, and the plastic then cooled and hardened.

17. The method of claim 16 wherein a two part polyurethane complex consisting essentially of isocyanate and polyol is injected into the mold.

* * * * *